(12) United States Patent
Suwa

(10) Patent No.: US 6,934,315 B2
(45) Date of Patent: Aug. 23, 2005

(54) CORDLESS TELEPHONE AND METHOD FOR SELECTING COMMUNICATION CHANNEL THEREOF

(75) Inventor: Yutaka Suwa, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 786 days.

(21) Appl. No.: 09/854,901

(22) Filed: May 15, 2001

(65) Prior Publication Data

US 2003/0058922 A1 Mar. 27, 2003

(30) Foreign Application Priority Data

May 30, 2000 (JP) .......................................... 2000-159856
May 17, 2000 (JP) .......................................... 2000-145189

(51) Int. Cl.$^7$ ............................... H04B 1/69; H04B 1/40
(52) U.S. Cl. .................................... 375/132; 455/74.1
(58) Field of Search ............................... 375/132, 130; 455/426, 509, 73, 74.1; 370/341, 443

(56) References Cited

U.S. PATENT DOCUMENTS 5,140,628 A * 8/1992 Murata et al. .............. 455/463
5,237,603 A * 8/1993 Yamagata et al. .......... 455/464
5,471,671 A * 11/1995 Wang et al. ............. 455/226.2

* cited by examiner

Primary Examiner—Khai Tran
(74) Attorney, Agent, or Firm—McDermott Will & Emery LLP

(57) ABSTRACT

In a cordless telephone on frequency hopping system, base unit and handset unit conduct communication after selecting channels of good communicating condition. The handset unit determines whether the communicating condition of each channel is bad based on electric field strength or CRC error rate (CRCE). Of a channel of bad communicating condition, the handset unit notifies the base unit of the channel number and electric field strength or CRCE. The base unit stores such information. When the number of the inferior channels becomes not less than a predetermined number and, further, information of a new inferior channel is notified by the handset unit, the base unit compares the information and information of stored inferior channels and judges the better of the channels as the channel to be used. The base unit notifies the handset unit of the channel information.

22 Claims, 9 Drawing Sheets

US 6,934,315 B2

CORDLESS TELEPHONE AND METHOD FOR SELECTING COMMUNICATION CHANNEL THEREOF

FIELD OF THE INVENTION

The present invention relates to a cordless telephone utilizing Frequency Hopping Spread Spectrum (FHSS) system and a method of channel setting in the cordless telephone.

BACKGROUND OF THE INVENTION

With the wide spread use of cordless telephones in recent years, there are demands for improvement in the cordless telephone and ensured security therein. As a communication system for enhancing security therein, there is FHSS system (hereinafter called "FH system").

In FH system, the second harmonic modulating frequencies are varied at random and the frequencies are allowed to make hopping so that a sound signal is transmitted and received over a plurality of channels differing in frequency. Accordingly, security in communications can be enhanced by the use of FH system.

According to communications protocol in the US, the number of channels available on FH system is 92 channels. Out of this, 75 channels are used for conversation. Therefore, it is required that 75 channels of good communicating condition be selected from 92 channels for use in conversation. Such a method has so far been in practice to leave out the portion of channels susceptible to a microwave oven and the like (for example, channel 56–channel 72 out of channels 1–75) as spare channels and not to use such spare channels for conversation. Since the number of usable channels is limited, the channels used have been virtually fixed to limited channels.

Thus, in cordless telephones on FH system so far in use, the channels used are virtually fixed. Accordingly, when background noise levels on such channels are relatively high, the S/N ratio of the communicated voice signal is deteriorated. Then, on the receiving end, it sometimes occurs that the sound signal is not accurately demodulated and contents of the conversation are not accurately conveyed.

SUMMARY OF THE INVENTION

In view of the above mentioned difficulties in the prior art, it is an object of the present invention to provide a cordless telephone on FHSS system capable of selecting channels of good communicating condition as the channels for use thereby demodulating a communicated sound signal accurately and also to provide a method for setting up such channels.

The cordless telephone on FHSS system of the present invention and the channel setting method used therein are related to a handset unit comprising main controller of the handset unit and a communication unit of the handset unit for communicating with a base unit and the base unit comprising a main controller of the base unit and a communication unit of the base unit for communicating with the handset unit.

The handset unit measures the field strength on a channel and, when communicating condition on the channel is determined to be bad based on the result of the measurement, determines that the channel is an inferior channel. The handset unit notifies the base unit of the channel number and the value of the field strength.

On the other hand, the base unit stores the channel number and the value of field strength in a storing unit of the base unit. When the number of the inferior channels becomes not less than a predetermined numbers and, further, notification of information on an inferior channel is received from the handset unit, the base unit compares the value of field strength of the new inferior channel with the value of field strength of inferior channel in storage.

As a result of it, the base unit determines the better of the channels as the channel to be used and notifies the handset unit of the information about the channel.

In the described manner, channels "P" whose communicating condition is good can be selected as channels to be used from channels "M" prior to the start of conversation.

The above described operations are performed in "channel setting stage."

Further, in the cordless telephone of the present invention and the channel setting method used therein, the handset unit, in the state of making conversation, checks communicating error condition of a selected channel. When the handset unit determines that the communicating error condition is bad, it stores the number of the selected channel and error information indicative of the communication error condition being bad and, further, notifies the base unit of such information. The handset unit, further, performs exchanging of channels in compliance with a request from the base unit for the exchange.

The base unit: i) stores the inferior channel number and information including the value of field strength and error information in the storing unit of the base unit as inferior channel information; and ii) selects, when the number of inferior channels becomes not less than a predetermined number, the channel having the lowest field strength of the channels graded as inferior channels before the start of the state of making conversation as a good channel and notifies the handset unit of information of the good channel.

In the stage of starting conversation, when the number of inferior channels counted through the above described steps is below the predetermined number, all of the used conversation channels are set to be good channels. On the other hand, when the counted number of inferior channels becomes not less than the predetermined numbers, a predetermined number of channels of relatively good communicating condition are used as the conversation channels.

The above described steps are performed in "conversation stage."

Thus, a cordless telephone on FHSS system capable of accurately demodulating communicated voice signal and a channel setting method used therein can be provided.

DESCRIPTION OF THE PREFERRED EMBODIMENTS

With reference to the accompanying drawings, a preferred embodiment of the invention will be described.

Figure 1:
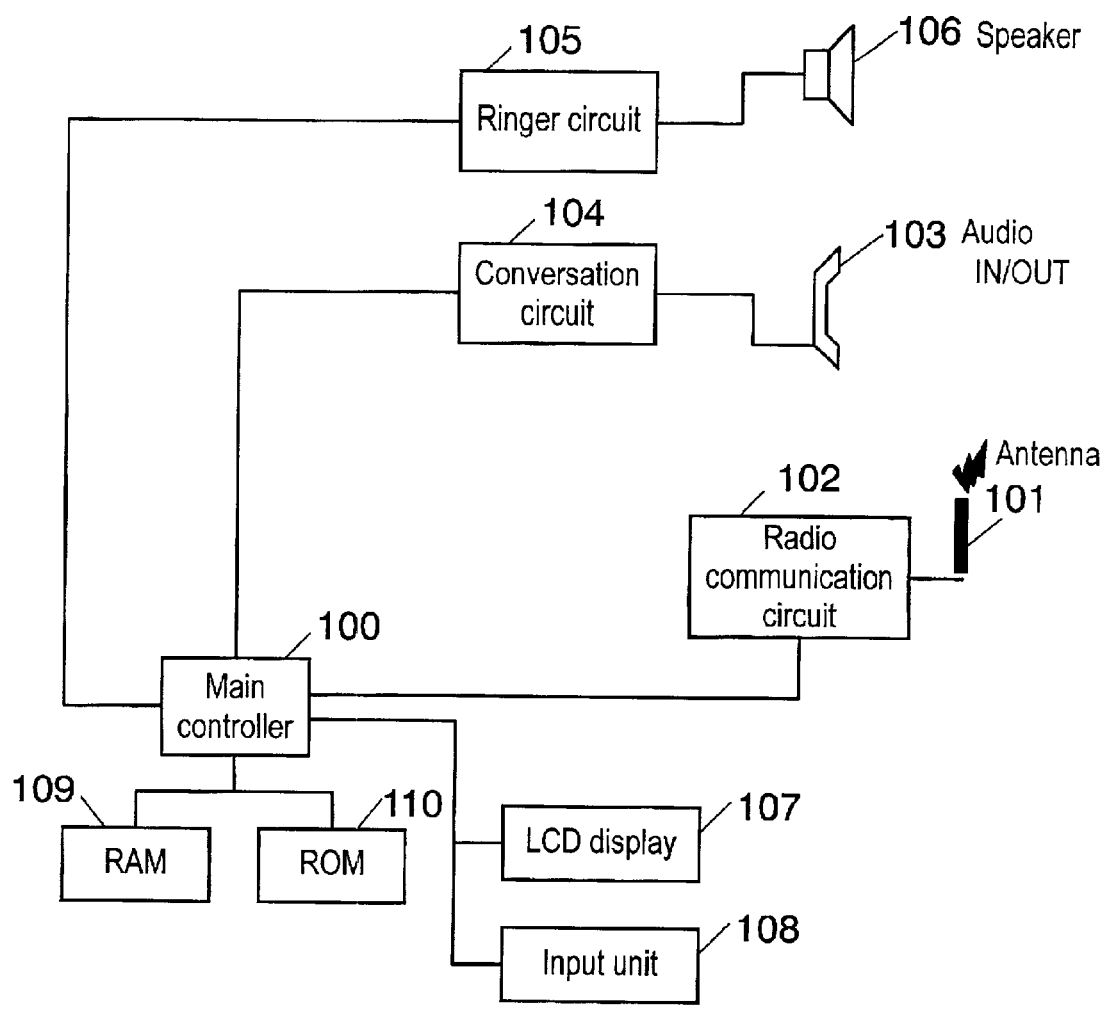
FIG. 1 is a block diagram showing a handset unit of a cordless telephone in a first embodiment of the present invention.

FIG. 1 is a block diagram showing a configuration of a handset unit of FH system cordless telephone according to the embodiment of the present invention.

Figure 2:
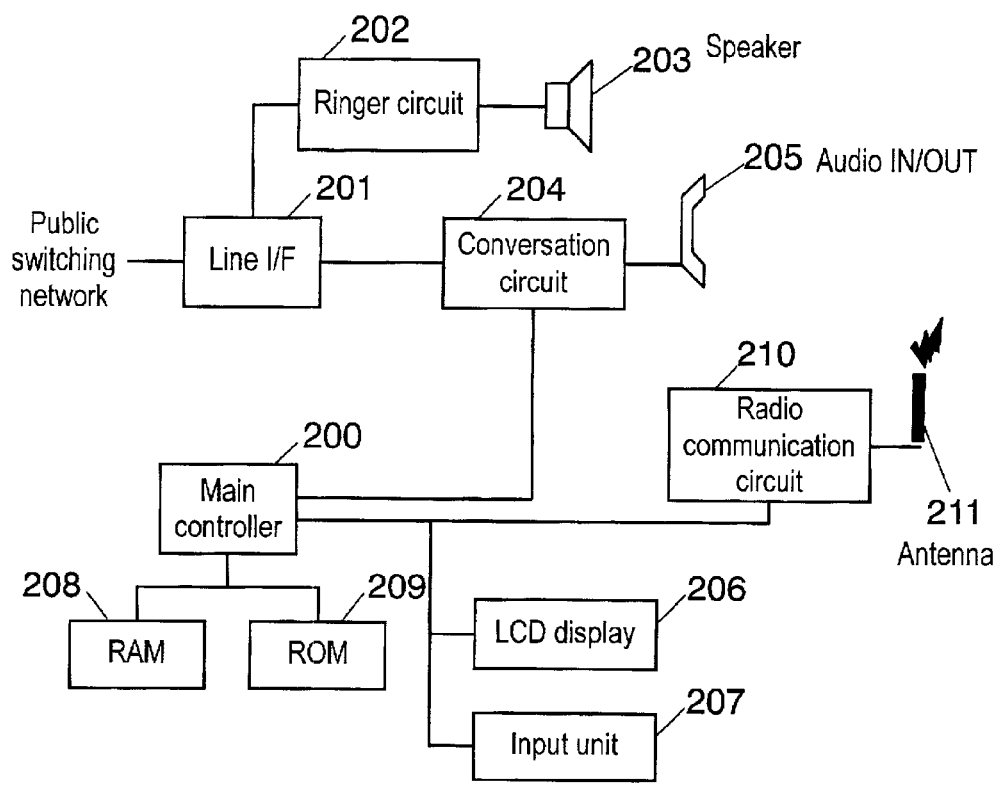
FIG. 2 is a block diagram showing a base unit of the cordless telephone.

FIG. 2 is a block diagram showing a configuration of a base unit of the cordless telephone.

In FIG. 1, main controller 100 executes, as a handset unit controller, general control of operations in the handset unit. Radio communication circuit 102 transmits and receives radio signals to and from the base unit by way of antenna 101. Audio IN/OUT 103 includes a speaker and a microphone for use in conversation. Conversation circuit 104 makes conversation, through the base unit, with a telephone on the other end over a public switching network. Ringer circuit 105 generates a ringing sound. Speaker 106 issues the ringing sound. Display 107 displays data. Input unit 108 gives instructions by depression of buttons or the like. RAM 109 functions as a memory of handset unit. ROM 110 stores programs and the like.

While the handset unit normally takes a form of a handset, it may also take a form of Personal Digital Assistance (PDA) comprising a display and an operating unit thereof. Thus, form of the handset is not limited.

In FIG. 2, main controller 200 functions as a base unit controller for controlling the entire unit. Line interface (line I/F) 201 performs such an operation as to adjust operation timing with the public switching network. Ringer circuit 202 detects a bell signal and generates a ringer sound. Speaker 203 issues a ringer sound. Conversation circuit 204 makes conversation with a telephone on the other end over a public switching network. Audio IN/OUT 205 includes a speaker and a microphone for use in conversation. Display 206 displays data. Input unit 207 gives instructions by depression of buttons and the like. RAM 208 functions as a memory of base unit and stores data. ROM 209 stores programs and the like. Radio communication circuit 201 transmits and receives radio signals by way of antenna 211.

Figure 3A:
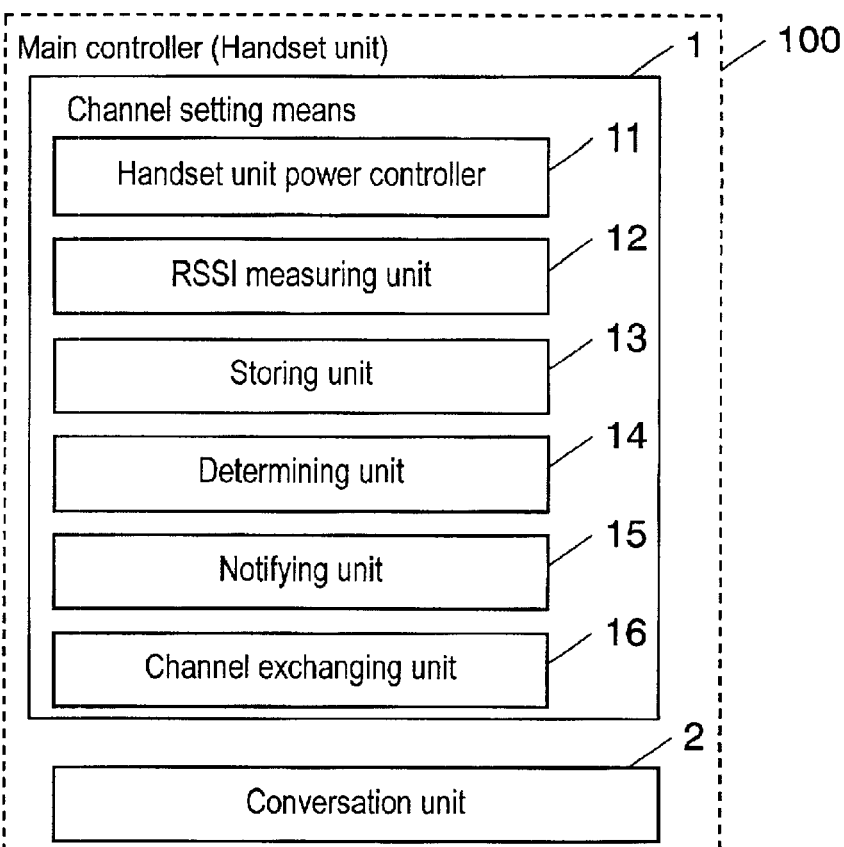
FIG. 3(a) is a functional block diagram of a main controller of handset unit.

FIG. 3(a) is a functional block diagram showing units for realizing functions in main controller of handset unit 100.

Figure 3B:
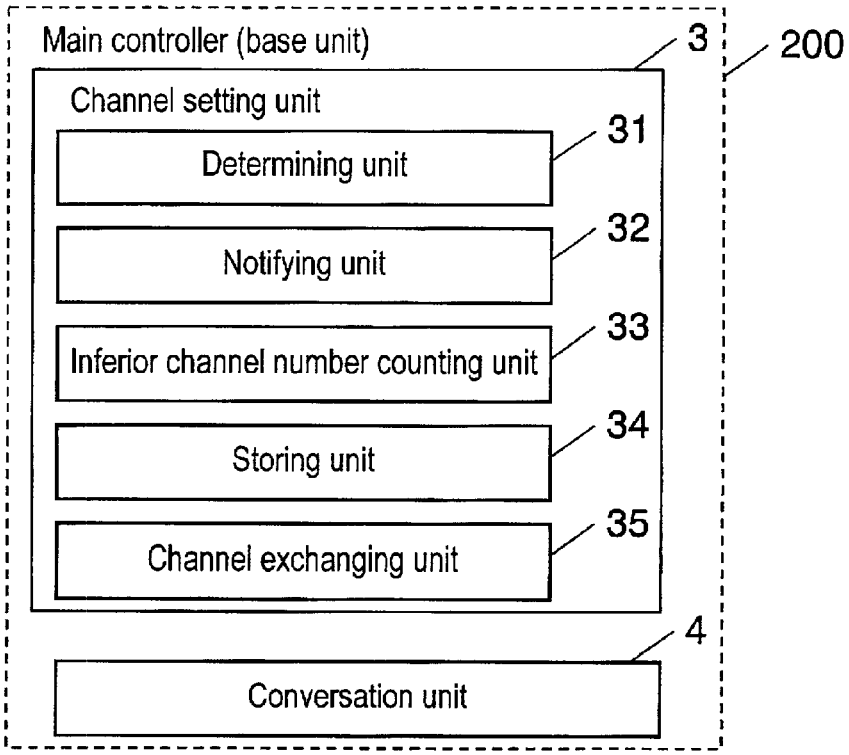
FIG. 3(b) is a functional block diagram of a main controller of base unit.

FIG. 3(b) is a functional block diagram showing units for realizing functions in main controller of base unit 200.

Referring to FIG. 3(a), channel setting unit of handset unit 1 sets up channels for use in conversation.

Conversation unit of handset unit 2 carries out control of conversation.

Channel selecting unit 11 selects channels as the objects of determination.

Received Signal Strength Indicator (RSSI) 12 measures RSSI on the channel selected by radio communication circuit 102.

Storing unit 13 stores the measured RSSI together with the channel number in storing unit of handset unit 109.

Determining unit 14 determines whether a selected channel should be graded as an inferior channel of which communicating condition is bad. Hereinafter, "channel of which communicating condition is bad" will be called "inferior channel" and "channel of which communicating condition is good" will be called "good channel."

Notifying unit 15, when a channel is graded as an inferior channel by determining unit 14, gives notification of the number of the inferior channel thus graded together with corresponding RSSI to the base unit through radio communication circuit of handset unit 102.

Channel exchanging unit 16, responsive to a request for exchanging from the base unit, exchanges an inferior channel for a good channel.

In main controller of base unit 200 shown in FIG. 3(b), channel setting unit 3 of base unit 200 sets up channels for use in conversation.

Conversation unit of base unit 4 carries out control of conversation.

Determining unit 31 determines whether the number of inferior channels counted in later described inferior channel number counting unit 33 is not less than a predetermined number. Further, determining unit 31, when it determines that the number of counted inferior channels is not less than the predetermined number, determines whether the newly generated inferior channel should be exchanged for an inferior channel in storage.

Notifying unit 32, when determining unit 31 determines that inferior channels should be exchanged, sends a request for the exchange to the handset unit through radio communication circuit of base unit 210.

Inferior channel number counting unit 33 counts the total number of inferior channels notified by the handset unit.

Storing unit 34 allows storing unit of base unit 208 to store inferior channel number and corresponding RSSI notified by the handset unit.

Channel exchanging unit 35, when determining unit 31 determines that inferior channels should be exchanged, performs the exchange.

Concerning handset unit and base unit of cordless telephone configured as described above, operations therein will be described by using FIG. 4–FIG. 6.

Figure 4:
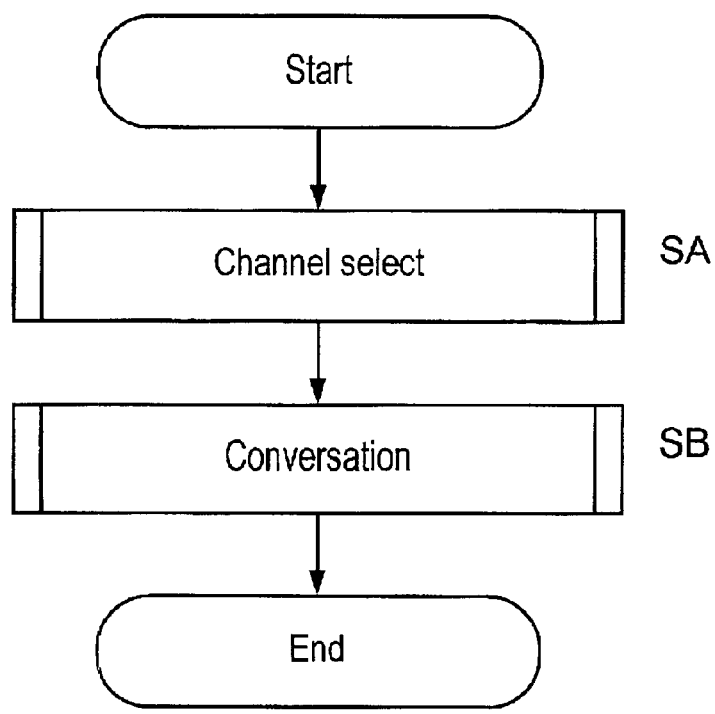
FIG. 4 is a flowchart showing operations common to the handset unit and base unit.

FIG. 4 is a flowchart showing operations common to the handset unit and base unit.

Figure 5:
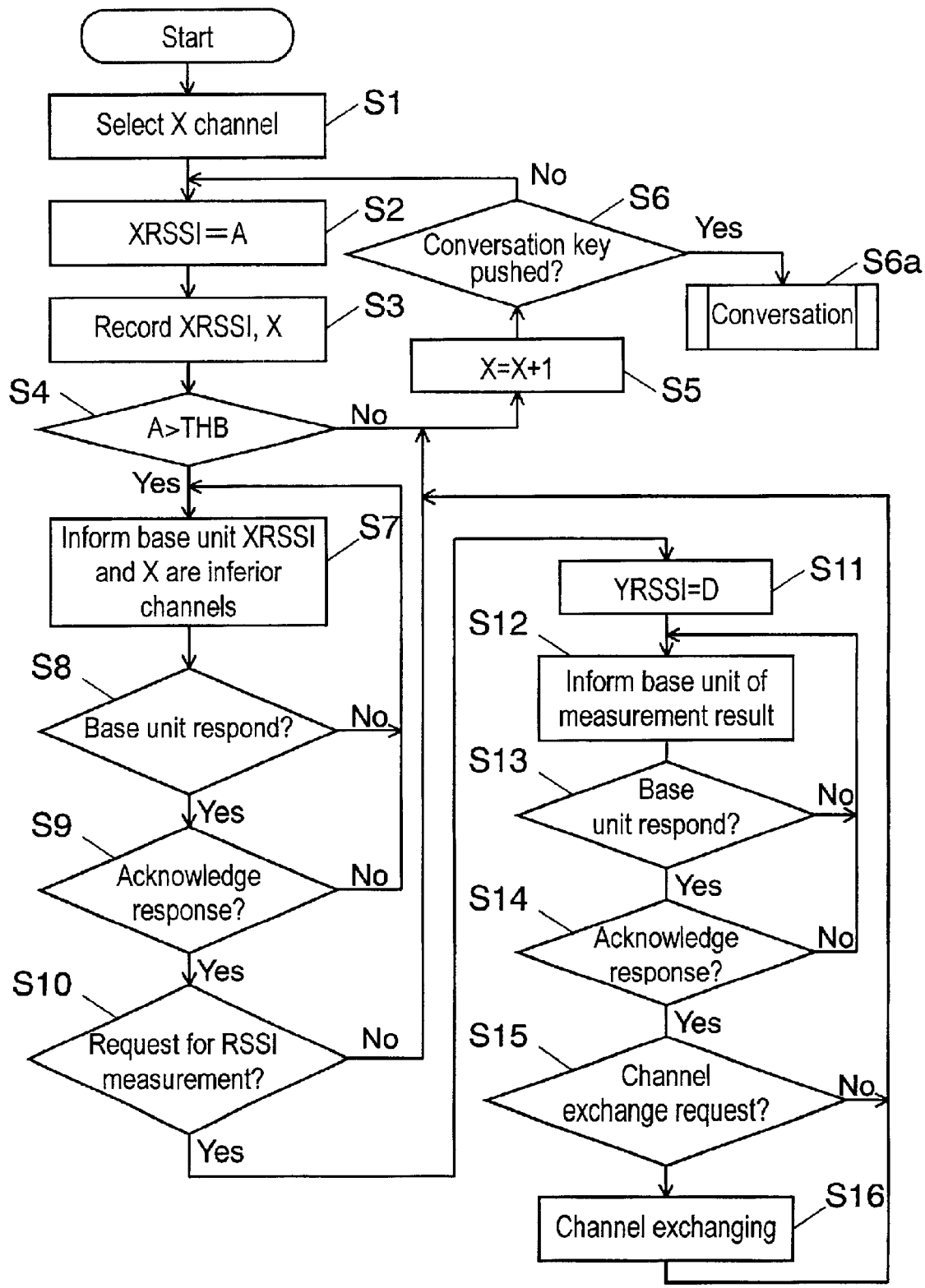
FIG. 5 is a flowchart showing channel setting operations in the handset unit.

FIG. 5 is a flowchart showing channel setting operation in the handset unit.

Figure 6:
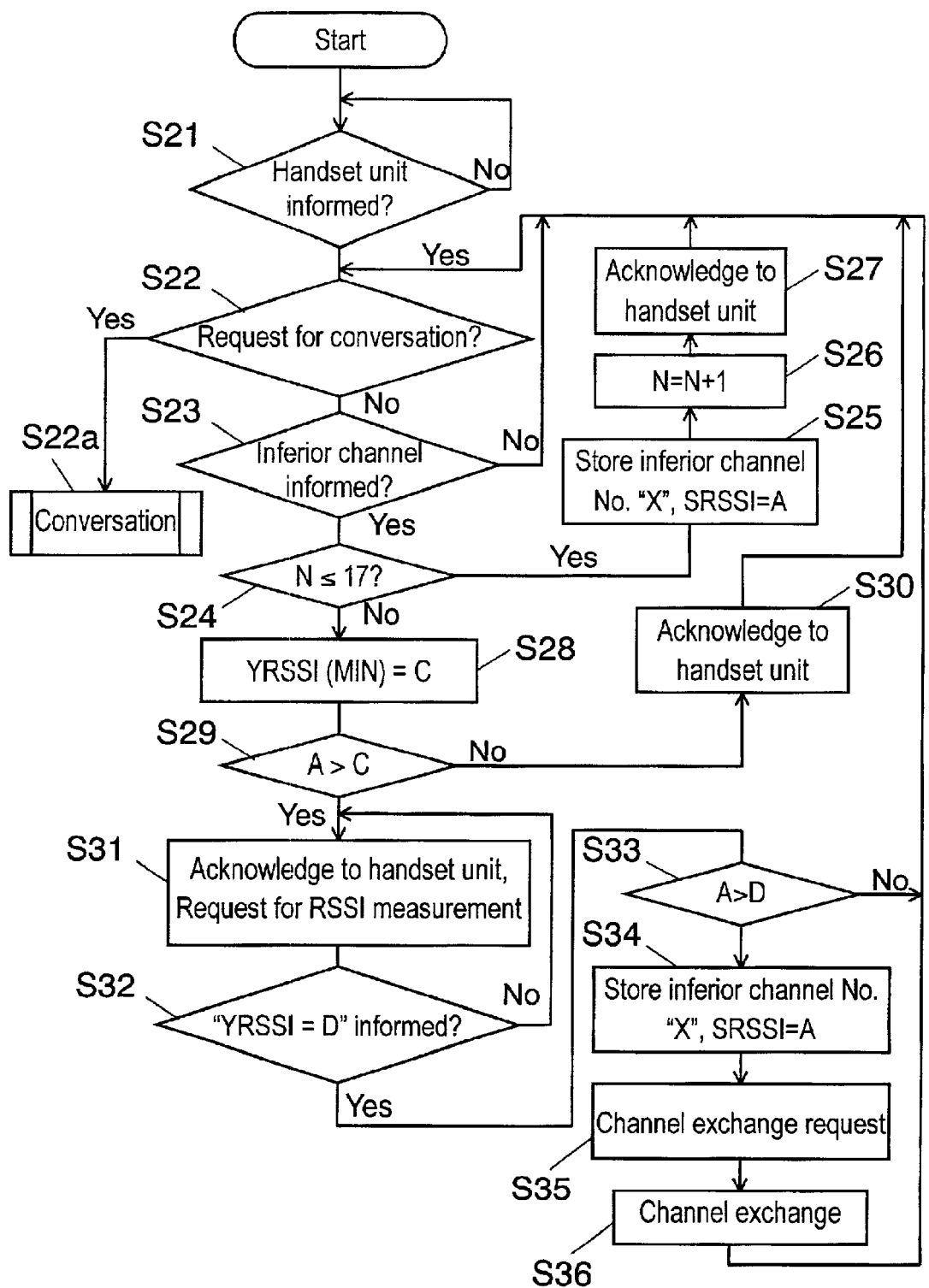
FIG. 6 is a flowchart showing channel setting operations in the base unit.

FIG. 6 is a flowchart showing channel setting operation in the base unit.

First, operations common to the base unit and handset unit will be described by using FIG. 4.

In FIG. 4, channel setting process (SA) is first performed both in handset unit controller 100 and base unit controller 200. Then conversation process (SB) is performed. One of the features of the present invention is that channel setting process (SA) is provided therein.

Channel setting operation (SA) will be described with reference to FIG. 5 and FIG. 6.

FIG. 5 shows channel setting operation in main controller of handset unit 100.

FIG. 6 shows channel setting operation in main controller of base unit 200.

First, channel setting operation in main controller of handset unit 100 will be described.

When the cordless telephone is started up in FIG. 5, channel selecting unit 11 first selects a channel as an object of determination, i.e., channel "X" (for example, the first channel of 92 channels) (S1).

Then, RSSI measuring unit 12 measures RSSI level on channel "X". Assume, here, that the result of measurement is X-RSSI level=A (mV) (S2).

Since, at this time, a conversation state is not yet established, the RSSI level represents a background noise level. The lower this level, the better is the communicating condition of the channel.

Then, storing unit 13 stores X-RSSI level measured by RSSI measuring unit 12 and channel number "X" in RAM 109 (S3).

Then, determining unit 14 compares value "A" of X-RSSI level measured in step S2 with threshold value THB (S4).

When X-RSSI level A as the background noise level is lower, then A≦THB holds, and processing proceeds to step S5. Here, channel selecting unit 11 increments the channel number by 1 to set X=X+1.

When channel number X exceeds its maximum, 92, to become X=X+1=93, it is reset to X=1.

Then, determining unit 14 determines whether the conversation key has been pressed down (i.e., whether a request for conversation has been made by the user) (S6).

Normally, the conversation key is not pressed down by the user immediately after a cordless telephone has been started up and, hence, processing does not proceed to step S6a for conversation process.

The time required for making a cycle of operations in the flowchart shown in FIG. 5 is 10 msec at the longest. Therefore, the channel setting operation shown in the flow chart is completed immediately after the cordless telephone is started up. More specifically, all of 92 channels as the conversation channels are subjected to determination without exception.

Incidentally, even if the user depresses the conversation key immediately after the start-up, the depression of the conversation key normally takes two seconds or so after the start-up at the soonest. Thus, the time required for completion of channel setting operation is extremely shorter than the time required for entering into a conversation state by depression of the conversation key.

Next, when A>THB is found as the result of comparison between X-RSSI level A and THB in step S4, the channel at this time is determined to be an inferior channel. When determined as an inferior channel, notifying unit 15 records this channel as an inferior channel.

Notifying unit 15, further, gives notification of the value "A" of X-RSSI level and channel number "X" at this time to the base unit through radio communication circuit of handset unit 102 and antenna of handset unit 101 (S7).

Then, determining unit 14 determines whether there is a response from the base unit (S8). When there is the response, determining unit 14 determines whether it is an acknowledgment response (ACK) (S9).

Notifying unit 15 performs the operation shown in S7 until determining unit 14 receives ACK.

Channel setting operation in main controller of base unit 200 shown in FIG. 6 will now be described. In FIG. 6, determining unit 31 determines whether there is a notification from the handset unit (S21).

When there is the notification, determining unit 31 determines whether there is a request for making conversation (S22).

As also described in step 6 of FIG. 5, no request for conversation can be made within a period of 2 seconds or so immediately after the start-up of a cordless telephone. Hence, no request for conversation comes from the handset unit until operations for the whole of the channels, i.e., 92 channels, are finished and, hence, processing never proceeds to S22a.

Then, determining unit 31 determines whether there is a notification of inferior channel (S23).

When an inferior channel notification as described in step S7 of FIG. 5 is found arrived, the same further determines whether or not number "N" of inferior channels is over a predetermined number (for example the number of spare channels=17) (S24).

When an inferior channel notification is received for the first time, setting in the cordless telephone at the time of its start-up is N=0. Hence, processing proceeds to step S25 so that inferior channel number X and level X-RSSI are stored in RAM 208.

Then, N=N+1 is set to count the number of inferior channels (S26).

As described above, N=N+1=1 holds when an inferior channel is generated for the first time.

Then, the base unit transmits acknowledgment response (ACK) to the handset unit through radio communication circuit of base unit 210 and antenna of base unit 211 (S27).

When, in step S24, the number of inferior channels has increased to N≧18 to exceed the above mentioned number of spare channels, determining unit 31 selects channel "Y" whose level is the lowest level Y-RSSI=C (mV) of those at X-RSSI level stored in storing unit of base unit 208 (S28).

Determining unit 31 compares level X-RSSI=A of the newest inferior channel with "C" (S29).

When A≦C, it means that the newest inferior channel is better than channel "Y" in communicating condition. Therefore, determining unit 31 regards the newest inferior channel as a good channel, while keeping "Y" channel graded as inferior channel.

Thereafter, the base unit transmits acknowledgment response (ACK) to the handset unit (S30).

When A>C is determination in step S29, it means that "Y" channel is better than the newest inferior channel in communicating condition. Accordingly, notifying unit 32 sends ACK to the handset unit and, at the same time, sends the same a request for measuring background level Y-RSSI=D of channel "Y" (S31).

In other words, the base unit requests the handset unit for measuring channel "Y" again until the result of measurement is notified by the handset unit (S32).

Returning to FIG. 5 description will be continued.

When determining unit of handset unit 14 determines that there is a request for measuring channel "Y" again from the base unit (S10), RSSI measuring unit 12 measures Y-RSSI level=D (S11).

Notifying unit 15 notifies the base unit of the result of measurement (S12).

The handset unit continues sending the notification until determining unit 14 determines that ACK has been received (S13, S14).

When it is determined that no request is made for measurement of RSSI in step S10, processing proceeds to step S5.

Returning to FIG. 6 again, description will be continued.

When determining unit 31 determines that notification of Y-RSSI level=D is received from the handset unit (S32), it then determines whether A>D holds (S33).

It is determined that A>D still holds, storing unit 34 stores, in order to store the newest inferior channel, as an inferior channel number "X" and X-RSSI level=A in RAM 208 (S34).

Notifying unit 32 sends the handset unit a channel exchanging request for grading channel Y as a good channel (i.e., a request for an exchange of channel Y for channel X) (S35).

Channel exchanging unit 35 executes the channel exchange in storing unit of base unit (RAM) 208 (S36).

After the channel exchange has been made, processing returns to step S22. Processing also returns to step S22 when it is determined that A≦D in step S33.

Returning again to FIG. 5, description will be continued.

When determining unit 14 determines that there is a channel exchanging request from the base unit (S15), channel exchanging unit 16 performs channel exchanging as was in the base unit (S16).

After the channel exchange has been made, processing returns to step S5. Processing also returns to step S5 when there is no channel exchanging request.

As described above, when the number of inferior channels counted in the base unit becomes not less than a predetermined number (18 channels, for example, exceeding 17 channels as the number of spare channels), a channel of relatively good communicating condition can be selected as a channel to be used.

More specifically, RSSI (X-RSSI) of an inferior channel generated after the number of inferior channels has exceeded a predetermined number and RSSI (Y-RSSI) which is the lowest noise level of the channels stored as inferior channels are compared with each other.

As a result, the channel of better communicating condition can be used as the channel to be used (steps S31–S36).

Here, when the counted number of inferior channels is below the predetermined number, all of the usable channels are regarded as good channels.

When, on the other hand, the counted number of inferior channels becomes not less than the predetermined numbers, there are some inferior channels whose degree of inferiority is lower.

Hence, P channels (75 channels, for example,) of relatively good communicating condition can be selected as channels to be used out of available 92 channels, for example. Thus, it is made possible to demodulate a voice signal included in a spread spectrum signal more accurately.

As described in the foregoing, channels of good communicating condition can be selected as channels to be used prior to the start of conversation. (Hereinafter, the process of selecting operation will be called "channel setting stage.")

Then, by using channels for conversation of relatively good communicating condition obtained through the above described steps, conversation process (SB) is performed, of which description will follow (hereinafter, the process of conversation operation will be called "conversation stage.")

Figure 7A:
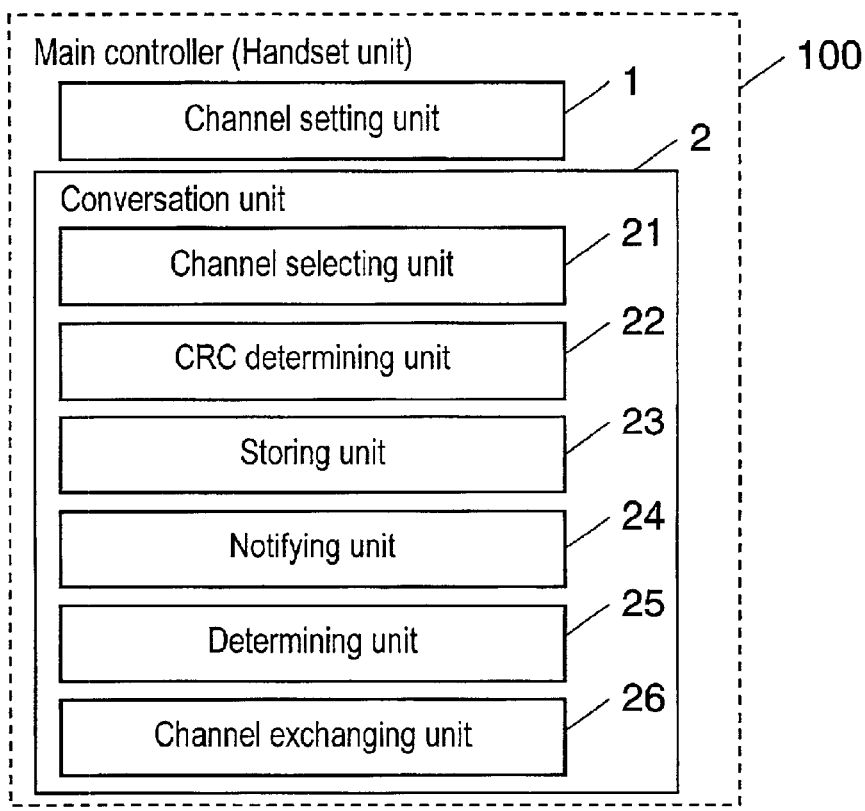
FIG. 7(a) is a functional block diagram showing a conversation unit in the main controller of handset unit.

FIG. 7(a) is a functional block diagram showing conversation unit 2 of the main controller of handset unit shown in FIG. 3.

Figure 7B:
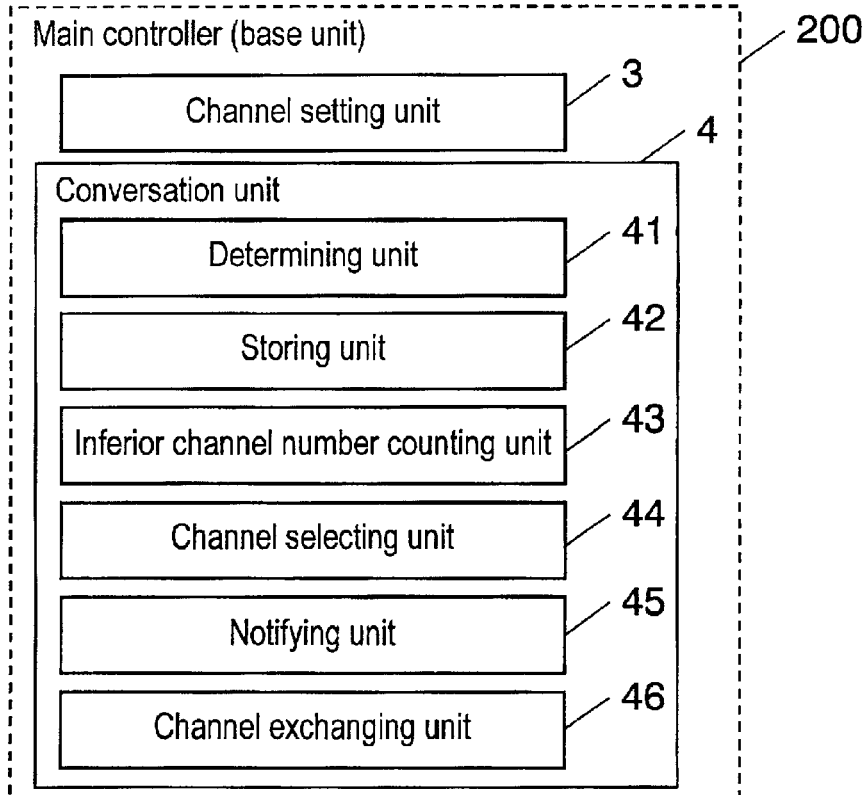
FIG. 7(b) is a functional block diagram showing a conversation unit in the main controller of base unit.

FIG. 7(b) is a functional block diagram showing conversation unit 4 of the main controller (base unit) shown in FIG. 3.

Conversation unit of handset unit 2 shown in FIG. 7(a) will be described.

In conversation unit of handset unit 2 shown in FIG. 7(a), channel setting unit 1 sets up channels. Conversation unit of handset unit 2 performs conversation. Channel selecting unit of handset unit 21 sequentially selects conversation channels. Cyclic Redundancy Code (CRC) determining unit 22 determines condition of communicating error, i.e., condition of bit error generation, on a selected conversation channel based on CRC error rate (CRCE). Here, CRC determining unit 22 compares CRCE, as an error rate based on CRC, with a predetermined error rate. When CRCE is equal to or greater than the predetermined error rate in a selected channel, then CRCE is regarded as being high ("H") and when CRCE is smaller than the predetermined error rate, then CRCE is regarded as being low ("L"). In other words, when CRCE is "H", it is determined that "communicating error condition is bad" and when CRCE is "L", it is determined that "communicating error condition is good".

In the present case, a CRC signal having a predetermined pattern is sent from the base unit to the handset unit for error rate checking. CRC determining portion 3 uses this pattern for obtaining CRCE.

When CRC determining unit 22 has determined that a conversation channel has "CRCE being "H"", storing unit 23 stores a set of error information consisting of the conversation channel number and the information of "CRCE being "H"" in RAM 109.

Notifying unit 24 notifies the base unit of the error information through radio communication circuit 102.

Determining unit 25 determines whether there is a response from the base unit and whether there is a channel exchanging request from the base unit.

When a channel exchanging request is sent from the base unit, channel exchanging unit 26 performs the channel exchange in compliance with the request from the base unit.

Conversation unit 4 shown in FIG. 7(b) will now be described.

In conversation unit (base unit) 4 of FIG. 7(b), determining unit 41 determine whether there is a notification of error information from the handset unit. When it is determined that there is an error information, determining unit 41 further determines whether the number of inferior channels has exceeded a predetermined number.

When it is determined that the number of inferior channels is not over the predetermined number, storing unit 42 stores the conversation channel specified in the error information in RAM 208 as an inferior channel.

When it is determined that the number of inferior channels is not over the predetermined number, inferior channel calculating unit 43 increments the number of inferior channels by 1.

When it is determined that the number of inferior channels is over the predetermined number, channel selecting unit 44 selects the channel RSSI level thereof is the lowest of the channels graded as inferior channels in the channel setup stage, as a new good channel.

Notifying unit 45 sends a request to the handset unit through radio communication circuit 210 for exchanging the conversation channel specified in the error information for the new good channel.

Channel exchanging unit performs exchanging of the conversation channel specified in the error information for the new good channel.

Figure 8:
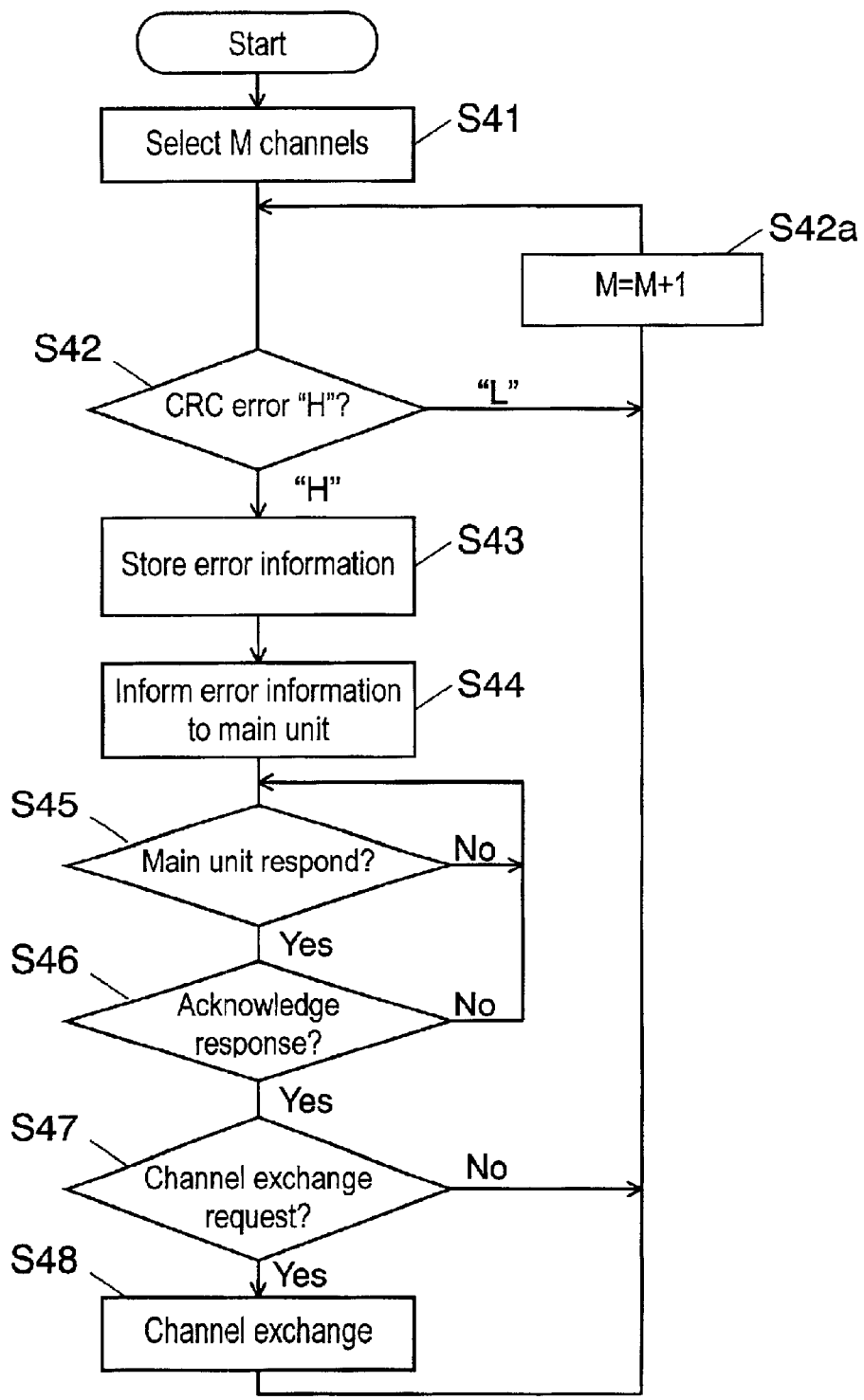
FIG. 8 is a flowchart showing conversation operation in the handset unit.

Of the handset unit and base unit of the cordless telephone configured as described above, operations in conversation units 2 and 4 will be described with reference to FIG. 8 and FIG. 9. FIG. 8 is a flowchart showing conversation operation in the handset unit.

Figure 9:
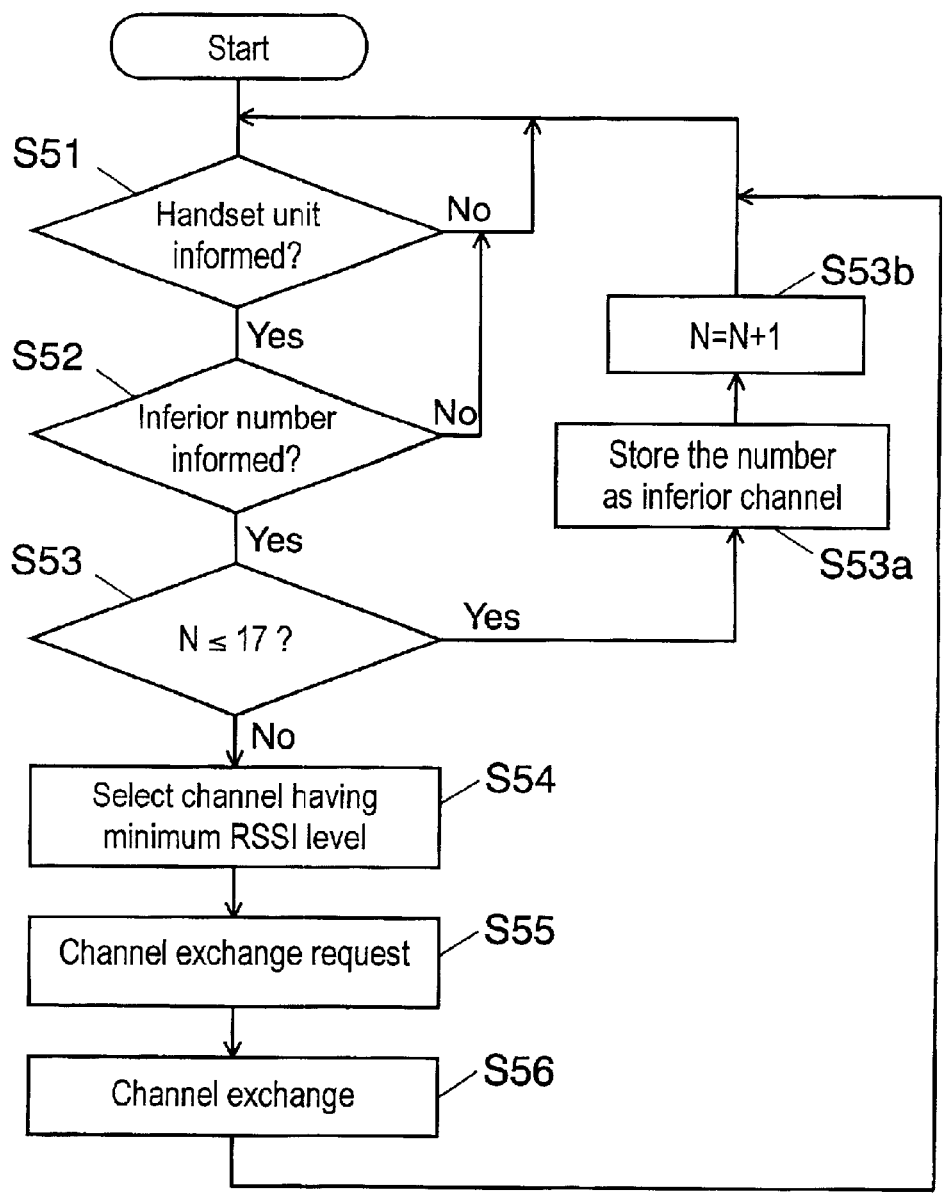
FIG. 9 is a flowchart showing conversation operation in the base unit.

FIG. 9 is a flowchart showing conversation operation in the base unit.

First, conversation operation in the handset unit will be described with reference to FIG. 8.

In FIG. 8, channel selecting unit 21 selects one conversation channel "M" out of a plurality of channels to be used for conversation (S41) and determines whether CRCE of the selected conversation channel "M" is "H" or "L" (S42).

When the CRC error is determined as "L" in step S42, channel selecting unit 21 selects a next conversation channel (M+1) (S42a).

When CRCE is determined as H in step S42, storing unit 23 stores error information consisting of the conversation channel number "M" and information indicating that "CRCE is "H"" in RAM 109 (S43).

Further, notifying unit 24 sends the error information to the base unit through radio communication circuit 102 (S44).

Then, determining unit 25 determines whether there is a response from the base unit and whether the response is ACK (S45, S46).

When there is no response from the base unit or when the response is not ACK, processing returns to step 44. When it is determined that ACK from the base unit is present, determining unit 25 determines whether there is a request for channel exchanging (S47).

When it is determined that there is no channel exchanging request, processing returns to step S42a (S48).

When it is determined that there is a channel exchanging request, channel exchanging unit 26 performs the exchange for the channel to be used responsive to the request from the base unit.

The request from the base unit, here, is a request for exchanging a conversation channel whose CRCE is "H" for a conversation channel determined to be good by the base unit. Responding to this request, channel exchanging unit of handset unit 26 exchanges a conversation channel whose CRCE is "H" for a conversation channel determined to be good by the base unit.

After the channel exchange has been made, processing returns to step S42a.

Conversation operation in the base unit will be described with reference to FIG. 9.

In FIG. 9, determining unit 41 determines whether there is notification of error information from the base unit (S51) and, then, determines whether there is notification of inferior channel (S52).

When it is determined that there is notification of error information and, further, notification of inferior channel, the same determines whether the number of inferior channels has exceeded predetermined number 17 (S53).

When it is determined that number of inferior channel N≦17 in step S53, storing unit 42 stores the conversation channel specified in the error information from the handset unit in RAM 208 as an inferior channel (S53a).

Inferior channel calculating unit 43 increments the number of inferior channels by 1 (S53b).

When it is determined that number of inferior channels N>17 in step S53, channel selecting unit 44 selects the channel whose RSSI level is the smallest of the channels graded as inferior channels in the channel setting stage, as a new good channel (S54).

Notifying unit 45 sends a request to the handset unit for exchanging the conversation channel specified in the error information for the new good channel through radio communication circuit 210 (S55).

Channel exchanging unit 46 performs the exchange of the conversation channel specified in the error information for the new good channel (S56).

As described above, CRC determining unit of handset unit 22, when selecting a conversation channel in the conversation stage subsequent to the channel setting stage, determines whether "H" or "L" CRCE of the selected conversation channel is.

Channel exchanging unit 26, when CRCE is determined to be "H", stores error information consisting of the conversation channel number and the information of CRCE being "H" and also notifies the base unit of the error information. Further, when a request for exchanging channels is received from the base unit, channel exchanging unit 26 performs the channel exchange responsive to the request from the base unit.

The base unit, when notified of the error information by the handset unit, determines whether or not the number of inferior channels is not less than a predetermined number. When it is determined that the number of inferior channels is below the predetermined number, storing unit of base unit 208 stores the conversation channel specified in the error information as an inferior channel.

Inferior channel calculating unit 43 increments the number of inferior channels by 1.

Channel selecting unit 44, when the same determines that the number of inferior channels is over the predetermined number, selects, as a new good channel, the channel RSSI level thereof is the smallest of the channels graded as inferior channels in the channel setting stage. Further, the base unit sends a request to the handset unit for exchanging the conversation channel specified in the error information for the new good channel.

Through the above steps, when the counted number of inferior channels is not less than the predetermined number: i) an inferior channel CRCE level thereof is determined as "H" in the conversation stage; and ii) the channel RSSI level thereof is the lowest of the channels graded as inferior channels in the channel setting stage are exchanged for each other.

The counted number of inferior channels here means "sum of the number of inferior channels determined in the channel setting stage and the number of inferior channels determined based on CRCE in the conversation stage". The predetermined number is set, for example, at 17 channels as the number of spare channels.

When the counted number of inferior channels is below the predetermined number, all the used conversation channels can be regarded as good channels.

Further, when the number of inferior channels has become not less than the predetermined number, some of inferior channels degree of inferiority thereof in communicating condition is relatively low can be picked out, so that relatively good channels of the predetermined number can be used as the conversation channels. Thus, it becomes possible to demodulate a voice signal contained in a spread spectrum signal substantially accurately.

What is claimed is:

1. A cordless telephone on Frequency Hopping Spread Spectrum (FHSS) system comprising:
   a handset unit;
   a base unit including a main controller of said base unit, a storing unit of said base unit, and a communication unit of said base unit communicating with said handset unit; wherein said handset unit
  i) measures field strength on a channel for use in communication, and
  ii) when communicating condition of the channel is determined to be bad based on a result of the measurement, grades the channel as an inferior channel and notifies the base unit of the value of the field strength together with a channel number; and
said base unit
  i) stores the channel number and the field strength in said storing unit of said base unit, and
  ii) when the number of the inferior channels has become not less than a predetermined number and when notified by said handset unit of information about a further inferior channel, compares field strength of the inferior channel with the field strength value of the stored inferior channel, determines the channel of better communicating condition as the channel to be used, and sends said handset unit a notice to switch the channel for use in communication to the channel to be used.

2. The cordless telephone according to claim 1, wherein said handset unit includes:
  a) a channel selecting unit for selecting the channel;
  b) a field strength measuring unit for measuring the field strength on the selected channel;
  c) a determining unit of said handset unit for determining whether the selected channel is the inferior channel;
  d) a notifying unit of said handset unit for notifying said base unit of the field strength together with the inferior channel number through a communication unit of said handset unit; and
  e) a channel exchanging unit for exchanging the inferior channel for the channel of better communicating condition responsive to an exchanging request from said base unit; and said base unit includes:
  f) an inferior channel number counting unit for counting the number of the inferior channels;
  g) a determining unit of said base unit for determining whether the number of the counted inferior channels is not less than the predetermined number and determining, when the number of the calculated inferior channels has become greater than the predetermined number inclusive due to the further inferior channel, whether the further inferior channel should be exchanged for the inferior channel stored in said storing unit;
  h) a notifying unit of said base unit for sending said handset unit, when said determining unit determines that the exchanging should be made, a request for performing the exchange through said communication unit; and
  i) a channel exchanging unit for performing the exchange.

3. The cordless telephone according to claim 1, wherein said handset unit, before entering into a state of making conversation, notifies said base unit of information about the inferior channel, while said base unit sends said handset unit a notice to switch the channel for use in communication to the channel to be used and in the state of making conversation,
said handset unit determines communication error condition of a selected channel and, when communication error condition of a selected channel is determined to be bad, notifies said base unit of the selected channel number and error information indicating communication error condition thereof being bad, and performs channel exchanging responsive to a request from said base unit for exchanging channels, and
said base unit:
  i) stores information including the inferior channel number and the value of the field strength, as well as the error information, in said storing unit of said base unit as inferior channel information and
  ii) selects, when the number of the inferior channels becomes not less than said predetermined number, the channel the field strength value thereof is the lowest of the channels graded as inferior channels before entering into the state of making conversation, as a good channel, and sends said handset a notification that the good channel should be used.

4. The cordless telephone according to claim 3, wherein said handset unit includes:
  a) a radio communication circuit of said handset unit for transmitting and receiving a radio-frequency signal;
  b) a channel selecting unit for sequentially selecting conversation channels;
  c) a communication error determining unit for determining communication error condition of a selected conversation channel;
  d) a notifying unit for notifying, when said communication error determining unit determines that the communication error condition is bad, the base unit of the error information through said radio communication circuit of said handset unit; and
  e) a channel exchanging unit for exchanging the conversation channels responsive to the request from the base unit, and said base unit includes:
  f) a storing unit of said base unit for storing data;
  g) a radio communication circuit of said base unit for transmitting and receiving a radio-frequency signal;
  h) a determining unit for determining whether there is notification of the error information from said handset unit and determining, when it is determined that the notification of the error information is received, whether the number of the inferior channels is greater than the predetermined number inclusive;
  i) a storing unit, when the number of the inferior channels is determined to be below the predetermined number, for allowing the conversation channel specified in the error information to be stored in said storing unit of said base unit as the inferior channel;
  j) an inferior channel number counting unit, when the number of the inferior channels is determined to be below the predetermined number, for incrementing the number of inferior channels by one;
  k) a channel selecting unit, when the number of the inferior channels is determined to be not less than the predetermined number, for selecting the good channel;
  l) a notifying unit for sending a request to said handset unit through said radio communication circuit of said base unit for exchanging the conversation channel specified in the error information for the good channel; and
  m) a channel exchanging unit for exchanging the conversation channel specified in the error information for the good channel.

5. The cordless telephone according to claim 3, wherein the communication error condition is determined to be: i) bad when Cyclic Redundancy Error Rate (CRCE) is not less than a predetermined error rate; and ii) good when the CRCE is below the predetermined error rate.

6. The cordless telephone according to claim 4, wherein the communication error condition is determined to be: i) bad when Cyclic Redundancy Error Rate (CRCE) is not less than a predetermined error rate inclusive; and ii) good when the CRCE is below the predetermined error rate.

7. A cordless telephone on Frequency Hopping Spread Spectrum (FHSS) system comprising:

a handset unit; and a base unit communicating with said handset unit, wherein, in a channel setting stage preceding a conversation stage, notification of information about a channel, communicating condition thereof is determined to be bad by said handset unit based on field strength, is given to said base unit, and said base unit sends said handset unit a notice that switching should be made to the channel to be used, and in the conversation stage, said handset unit determines communication error condition of a channel selected from the channels determined to be used in the channel setting stage, and said base unit, based on communication error condition determined by said handset unit, selects the channel, field strength thereof is the smallest of the channels graded as inferior channels in the channel setting stage, as a new channel to be used and sends said handset unit a notice that switching should be made to the new channel to be used.

8. The cordless telephone according to claim 7, wherein the communication error condition is determined to be: i) bad when Cyclic Redundancy Error Rate (CRCE) is not less than a predetermined error rate; and ii) good when the CRCE is below the predetermined error rate.

9. A method of channel setting for setting channels of good communicating condition in a cordless telephone on FHSS system including a handset unit and a base unit comprising the steps of:

a) setting the channels of good communicating condition in said handset unit; and b) setting the channels of good communicating condition in said base unit; wherein said step a) includes the steps of:

a-1) selecting a channel as an object of determination;

a-2) measuring field strength on the selected channel;

a-3) determining whether the selected channel should be graded as inferior channel based on the field strength;

a-4) notifying said base unit of the measured field strength together with channel number of the determined inferior channel; and a-5) exchanging the inferior channel for a good channel responsive to a request for exchanging from said base unit; and said step b) includes the steps of:

b-1) storing the inferior channel number and the field strength;

b-2) counting number of the inferior channels;

b-3) determining whether the counted number of the inferior channels is greater than a predetermined number inclusive;

b-4) determining, when the counted number of the inferior channels is determined to be not less than the predetermined number, whether a further inferior channel should be exchanged for an inferior channel of the stored channels;

b-5) sending, when the exchanging is determined to be made in said step b-4), a request to said handset unit for perfuming the exchange; and b-6) performing, when the exchanging for the inferior channel is determined to be made in said step b-4), the exchange.

10. The method of channel setting according to claim 9, wherein said step a) further includes the steps of:

a-6) sequentially selecting channels for conversation;

a-7) determining whether good or bad communication error condition of the selected channel for conversation is;

a-8) grading a channel as the inferior channel when communication error condition thereof is determined to be bad in said step a-7) and notifying said base unit of the channel number of the selected channel for conversation and error information indicating that communication error condition thereof is bad; and a-9) performing exchanging of channels in compliance with a request from said base unit; and said step b) further includes the steps of:

b-7) determining whether notification of the error information is arrived;

b-8) determining, upon receipt of the notification of the error information, whether the number of the inferior channels exceed the predetermined number;

b-9) storing, when the number of the inferior channel is determined to be smaller than the predetermined number, the channel for conversation specified in the error information as the inferior channel;

b-10) incrementing the number of inferior channels by 1 when the number of the inferior channels is determined to be smaller than the predetermined number;

b-11) selecting, when the number of the inferior channels is determined to be not less than the predetermined number, a channel field strength level thereof is the lowest of the inferior channels stored in said step b-1), as a new good channel;

b-12) sending the handset unit a request for exchanging the channel specified in the error information for the new good channel; and b-13) exchanging the channel for conversation specified in the error information for the new good channel.

11. The method of channel setting according to claim 10, wherein the communication error condition is determined to be: i) bad when Cyclic Redundancy Error Rate (CRCE) is not less than a predetermined error rate; and ii) good when the CRCE is below the predetermined error rate.

12. A method, in a cordless telephone on FHSS system including a handset unit and a base unit, of channel setting for carrying on a conversation over a channel of good communication error condition comprising the steps of:

a) discriminating, before the conversation is started, channels of good communicating condition and channels of bad communicating condition;

b) selecting further, at the handset unit, channels for conversation from the good channels; and c) selecting further, at the base unit, channels for conversation from the good channels; wherein said step b) includes the steps of:
- b-1) sequentially selecting channels for conversation;
- b-2) determining whether good or bad communication error condition of the selected channels for conversation is;
- b-3) grading a channel as an inferior channel when the communication error condition thereof is determined to be bad in said step b-2), and notifying said base unit of the channel number of the selected channel for conversation and error information indicating that the communication error condition thereof is bad; and
- b-4) making channel exchanging responsive to a request from said base unit; and said step c) includes the steps of:
- c-1) determining whether notification of the error information is received;
- c-2) determining, upon receipt of the error information, whether the number of the inferior channels exceed a predetermined number;
- c-3) storing, when the number of inferior channels is determined to be smaller than the predetermined number, the channel for conversation specified in the error information as the inferior channel;
- c-4) incrementing, when the number of inferior channels is determined to be smaller than the predetermined number, the number of inferior channels by one;
- c-5) selecting, when the number of the inferior channels is determined to be not less than the predetermined number, a channel electric field strength thereof is the smallest of the channels graded as inferior channels in step a), as a new good channel;
- c-6) sending said handset unit a request for exchanging the channel for conversation specified in the error information for the new good channel; and
- c-7) exchanging the channel for conversation specified in the error information for the new good channel.

13. The method of channel setting according to claim 12, wherein
the communication error condition is determined to be: i) bad when Cyclic Redundancy Error Rate (CRCE) is not less than a predetermined error rate; and ii) good when the CRCE is below the predetermined error rate.

14. A cordless telephone on Frequency Hopping Spread Spectrum (FHSS) system comprising:
- a handset unit; and
- a base unit including a storing unit of said base unit, and a communication unit of said base unit communicating with said handset unit, wherein said handset unit:
- i) measures communicating condition of a channel for use in communication, and
- ii) notifies said base unit of said channel as an inferior channel when said communicating condition of said channel is determined inferior based on a result of the measurement, and wherein said base unit:
- i) stores said inferior channel in said storing unit, and
- ii) selects one of inferior channels stored in said storing unit and notifies said selected inferior channel to said handset unit to be used when a total number of said inferior channel has become greater than a predetermined number.

15. The cordless telephone according to claim 14, wherein said communicating condition of said channel is determined inferior based on field strength of said channel.

16. The cordless telephone according to claim 15, wherein said communicating condition of said channel is determined inferior in case that a level of said field strength is higher than a predetermined level.

17. The cordless telephone according to claim 14, wherein said communicating condition of said channel is determined inferior based on an error rate of said channel.

18. The cordless telephone according to claim 17, wherein said communicating condition of said channel is determined inferior in case that said error rate is greater than a predetermined error rate.

19. The cordless telephone according to claim 14, wherein said base unit selects said one of inferior channels based on said field strength of said channel for use in communication.

20. The cordless telephone according to claim 15, wherein said base unit selects said one of inferior channels based on said field strength.

21. The cordless telephone according to claim 17, wherein said base unit selects said one of inferior channels based on said field strength of said channel for use in communication.

22. The cordless telephone according to claim 18, wherein said base unit selects said one of inferior channels based on said field strength of said channel for use in communication.

* * * * *